United States Patent [19]

Satterfield et al.

[11] Patent Number: 5,082,716
[45] Date of Patent: Jan. 21, 1992

[54] HEADLINER

[75] Inventors: Marshall G. Satterfield, Johnstown; David M. Steinke, Baltimore; Michael Blankenship, Pataskala, all of Ohio

[73] Assignee: Process Bonding, Inc., Johnstown, Ohio

[21] Appl. No.: 646,956

[22] Filed: Jan. 28, 1991

Related U.S. Application Data

[62] Division of Ser. No. 421,965, Oct. 16, 1989, Pat. No. 5,007,976.

[51] Int. Cl.⁵ .......................... B32B 5/18; B32B 7/02; B60R 13/02
[52] U.S. Cl. .................................. 428/175; 296/214; 428/247; 428/251; 428/308.4; 428/316.6; 428/317.1
[58] Field of Search ................... 428/246, 247, 316.6, 428/317.1, 175, 251, 308.4; 296/214

[56] References Cited

U.S. PATENT DOCUMENTS

| 4,211,590 | 7/1980 | Steward et al. | 156/79 |
| 4,350,734 | 9/1982 | Hammond | 428/308.4 |
| 4,414,265 | 11/1983 | Rosato et al. | 428/316.6 |
| 4,478,660 | 10/1984 | Landler et al. | 156/78 |
| 4,695,501 | 9/1987 | Robinson | 428/316.6 |
| 4,721,643 | 1/1988 | Harayama | 428/90 |
| 4,741,945 | 5/1988 | Brant et al. | 296/214 |
| 4,798,756 | 1/1989 | Fukushima et al. | 428/317.7 |
| 4,826,552 | 2/1989 | Breitscheidel et al. | 156/221 |

Primary Examiner—James C. Cannon
Attorney, Agent, or Firm—Sidney W. Millard

[57] ABSTRACT

A headliner for mounting in the passenger compartment of a vehicle is formed from a plurality of layers of materials including foamed polyurethane, fiber glass, scrim and remay. The layers are bonded together under heat and pressure which cures an incorporated adhesive.

4 Claims, 1 Drawing Sheet

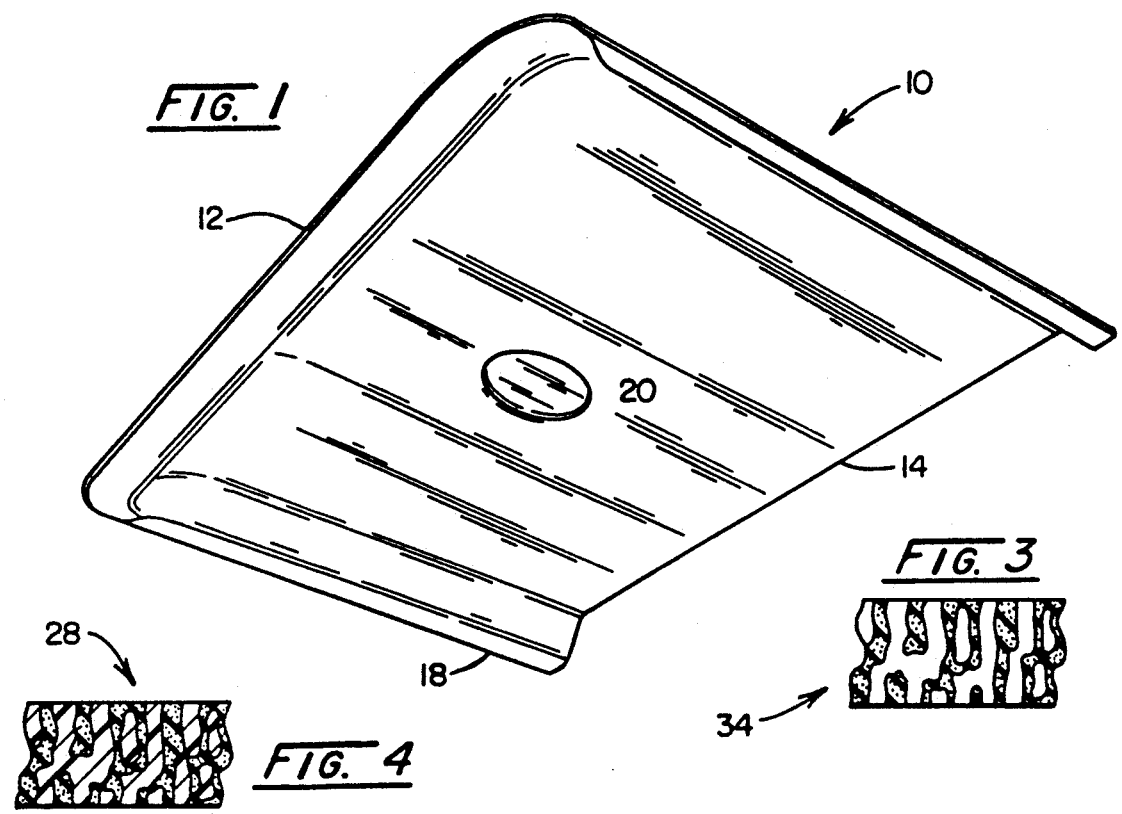
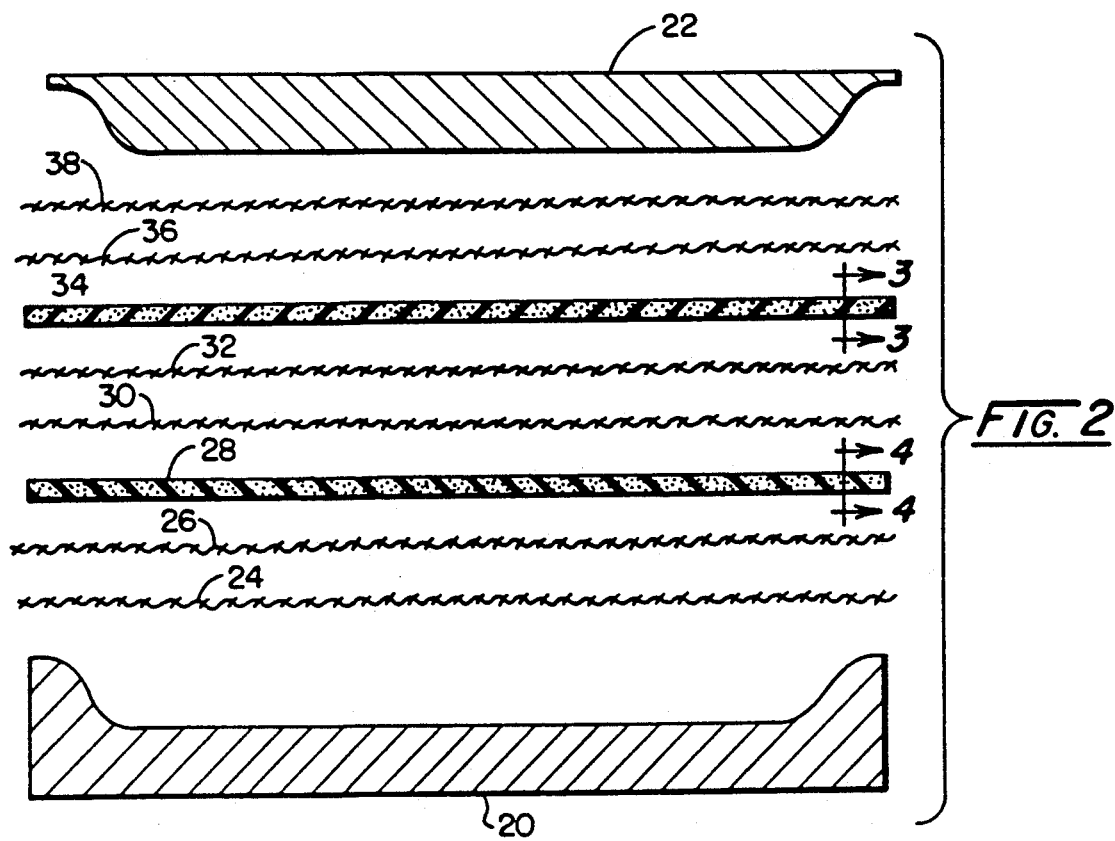

HEADLINER

This is a division of application Ser. No. 421,965, filed Oct. 16, 1989, now U.S. Pat. No. 5,007,976.

FIELD OF THE INVENTION

This invention relates to a laminated panel and one use contemplated is as a headliner in the passenger compartment of trucks and passenger vehicles.

BACKGROUND OF THE INVENTION

Headliners for vehicles are conventionally fiber glass or multi-layered laminated panels incorporating fiber glass and foam resin layers. The fiber glass or layers are placed between mirror image mold surfaces, compressed, heated to cure an incorporated resin adhesive, and then cut to shape at their periphery. Sometimes apertures for window openings, light fixtures, sun visors and the like are cut after molding. More often than not, in the assembly of the vehicle the headliner is inserted through the front window before the windshield is mounted. The typical headliner is concave downward and is sufficiently rigid to hold its shape when mounted along its side edges and with the central part of the headliner juxtaposed to the roof.

Various problems exist in the assembly of the headliner and one of those problems is that the headliner includes a decorative layer as the exposed surface visible to the passengers. Any folds, bends or blemishes in the visible surface creates a problem for one marketing the vehicle. As a practical matter, it is unacceptable to have exposed blemishes.

The headliner serves three other functions in addition to aesthetics which may be at odds with the concern for exposed blemishes. One problem is to provide a soft surface to minimize injury with head bumps. Fiber glass headliners are hard as are conventional headliners incorporating foamed resin. The only cushioning is in the decorative fabric. A second function is insulation from heat between the roof of the car and the interior or passenger compartment. The third function is sound insulation from exterior wind noise, engine noise, and the like.

A common solution to the problem of heat and noise insulation is the use of foamed resin layers in the headliner. The foamed resin is a better heat and sound barrier than resin impregnated fiber glass. Unfortunately, the foamed resin used is of the "closed cell" variety which includes a plurality of bubbles throughout the resin and a sealed skin surface on the surface of the resin layer. Foamed resin is initially quite rigid and with a sealed skin coating it will be even more rigid. Therefore, when the headliner must be bent or folded out of its original molded shape to get it into the proper position for installation in the vehicle it will often crack and/or rupture bubbles within the foamed layer itself. This often leaves a crease in the headliner which will be visible through the fabric. That is also true of fiber glass headliners. This exposed crease problem makes the flawed headliner unusable from a practical standpoint. As a consequence of the problem, the size of the windshield opening will often be dictated by the size of the headliner which must be inserted (whether the car manufacturer knows it or not).

The patent to Steward et al, U.S. Pat. No. 4,211,590, discloses a process for manufacturing a headliner for a passenger vehicle and the laminated contoured headliner includes one or more foamed resin thermoplastic layers of the closed cell variety sandwiched between a pair of rigid thermoplastic skin coats.

The patent to Harayama et al, U.S. Pat. No. 4,721,643, discloses another process for making a headliner and it too discloses a thermoplastic foamed resin layer of closed cells. The disclosure includes a laminate of a plurality of layers but all are structured so that there is a surface skin layer at each boundary of each foamed resin layer which inherently makes for rigidity and crease problems in assembling the headliner.

The patent to Landler et al, U.S. Pat. No. 4,478,660, discloses a different laminate and different process for making a foamed plastic layer in a decorative panel but it is even more rigid because of the incorporation of a hardenable resin mixed with wood dust filler in one layer.

The patent to Breitscheidel et al, U.S. Pat. No. 4,826,552, discloses a process for making a panel using an elastomeric, fiber glass reinforced, foam and a polymer substrate. It is clear from a reading of the patent that the rigidity of the resulting panel would make it inappropriate for a headliner.

The product on the market which is currently being used for headliners which is similar to the instant invention is a laminated panel which includes a decorative fabric layer for its exposed surface and the fabric is bonded directly to a closed cell foamed resin layer, the layer being coated on both sides with a hard resin skin. The next layer is a fiber glass mat which is sandwiched between the aforementioned foamed resin layer and another which is essentially identical. The backing layer is scrim. In both cases the closed cell foam used is coated on both sides and has an industry designation "120 ILD". The panel is relatively rigid and a fold will result in a permanent crease clearly visible through the fabric layer.

SUMMARY OF THE INVENTION

To solve these problems a laminated panel is provided of sufficient flexibility that it will not show a crease at the fabric surface even if the panel is folded three or four times over itself. This property is accomplished by using an open cell foamed thermoplastic resin of polyurethane rather than the closed cell thermoplastic resin used by the prior art. Additionally, a special adhesive mixture is used to bond the layers of material together. It is a blend of about two-thirds polyol, about one-third isocyanate, and a catalyst.

One open celled, foamed resin layer near the decorative fabric is uncoated with the adhesive and as a consequence gives the fabric surface a soft feel, due to the open cell structure. A second open celled, foamed resin layer is located near the roof of the vehicle and it is saturated with the adhesive. The adhesive will harden during curing and the back or outermost surface of the laminate will feel hard.

The laminate includes a plurality of woven layers which are known as "crim" and "remay", terms that are well known in the industry.

The term "scrim" as used in the industry refers to a thin woven fabric not unlike cheese cloth which is formed of cotton fibers or other materials having an absorbent quality to assure a proper bond with the liquid adhesive used. The fact that it is woven gives the laminated panel dimensional stability and strength in two orthagonal directions.

The term "remay" refers to a mat of non-aligned fibers of spun polyester which adds strength to the overall structure.

Within the laminate are two layers of a fiber glass mat. The mat has strands of spun fiber glass and when cured in the laminate it gives the panel strength in tension. The two fiber glass layers are separated by other layers within the laminate and the random orientation of the fibers serves to strengthen the panel in tension in all directions.

In forming the preferred panel the layers are sequentially stacked on a bottom part of a mold which has a curved surface and from the bottom to the top the layers comprise scrim, fiber glass, foamed urethane, fiber glass, scrim, foamed urethane, remay, and decorative fabric. Several of the layers are impregnated with a liquid urethane adhesive prior to assembly. After this stack of eight layers i assembled, the top half of the mold, which is essentially a curved mirror image of the bottom part of the mold, is pressed into the stack and by heat and pressure cures the adhesive. Thereafter, the panel is removed from the mold and trimmed to the desired size.

In some instances it may be desired to invert the stacked sequence to place the decorative layer as the bottom layer. In that instance the fabric will serve as an insulating layer against the bottom mold surface; the reasons will be explained subsequently.

During the press and heat molding process the pressure applied is in the range of about 5-50 tons for a duration of about three minutes.

Because of the time period involved in assembling the layers of the laminate and the curing temperature of the adhesive, it is preferred that the lower mold surface not exceed about 200° F. because temperatures in excess of that tend to prematurely cure the adhesive even before the upper surface of the press has been moved into proper position. Premature curing of the adhesive results in separations of certain layers. Preferably the upper part of the mold is heated to a temperature of about 275° F. because the preferred adhesive cures at a temperature in the range of about 200°-275° F. The curing process requires water but under normal circumstances there is adequate water vapor in the air at ambient temperatures. In severe winter temperatures the moisture content of the air may be too low and generally a humidifier in the area of the mold may be required when the relative humidity is below about 50% at a temperature of about 75° F. Conversely, in hot summer weather the high humidity is sometimes a problem. It has been discovered that where the ambient temperature is above about 75° F. and the relative humidity is above about 80% there is premature curing of the adhesive prior to furnace heating.

Objects of the invention not clear from the above will be fully understood upon a review of the drawings and a description of the preferred embodiment which follow.

BRIEF DESCRIPTION OF DRAWINGS

FIG. 1 is a perspective view of a headliner as may be used in truck cabs;

FIG. 2 is a schematic illustration of the stack of materials to be assembled in sequence between two mold surfaces shown in section;

FIG. 3 is a fragmentary sectional view showing the open cell construction of the foamed resin according to this invention, taken along line 3—3 of FIG. 2; and FIG. 4 is a fragmentary sectional view showing the open cell structure of the foamed resin layer filled with adhesive.

DESCRIPTION OF THE PREFERRED EMBODIMENT

FIG. 1 illustrates a headliner 10 having front 12 and rear 14 edges and curved downward at the side edges 16 and 18. A circular depression 20 appears in the middle and perhaps it could be cut from the panel to serve as an opening for the installation of a passenger light. The general shape of the headliner is for illustrative purposes only as each model of truck, van, or passenger vehicle will have its own distinctive shape.

It is believed that the inventive concept can best be appreciated by a description of how the headliner is assembled.

ᴠ The headliner itself in this preferred embodiment includes eight layers and in the process of manufacturing the panel, the layers are mounted or stacked on the bottom half of a pair of molds in the inverse order from how they would appear to a passenger sitting in the cab looking at the headliner. In other words, the first layer in the stack of the laminated panel will be the layer closest to the roof of the cab and the last layer assembled in the stack will be the fabric or other decorative layer which will be visible to the passenger. In some instances the order may be reversed for various reasons; one reason may be the insulation factor of the decorative fabric in direct contact with the lower mold surface. Should this latter sequence be preferred with the decorative fabric being the first layer on the bottom mold, then the molds illustrated in FIG. 2 will be inverted.

Looking specifically to FIG. 2, the anticipated eight layers of the laminate are shown in position between a lower mold 20 having a concave upper surface and an upper mold 22 having a convex lower surface. Note that the mold surfaces are both curved and the upper mold surface is generally a mirror image of the lower mold surface.

The first layer in the stack is a scrim layer 24 and it will be juxtaposed to a fiber glass mat 26. Both are impregnated with adhesive. The third element in the stack is a one-fourth inch thick foamed polyurethane, open celled, layer 28 impregnated with an adhesive. The fourth layer on the stack is another fiber glass mat 30 which is substantially identical to mat 26.

The next layer in the upward direction is another adhesive impregnated scrim layer 32 and immediately on top of that is another layer of polyurethane foam 34. Both layers of foam are open celled structures, as best illustrated in FIG. 3 and 4. But the open cells of layer 28 are filled with adhesive, see FIG. 4. Thereby when the ultimately laminated product is being assembled in a vehicle, the folding or bending of the molded product will not cause a collapse or bursting of the hollow closed cells areas as are found in conventional foamed resin layers used by others. In this invention, in layer 28, the cells contain adhesive. This gives the back of the panel a hard feel. On the other hand, layer 34 as illustrated in FIG. 3 has a soft feel because the pores or cells are open. Thus a bending of the panel may cause a break or line in layer 28 but the break cannot propagate to the fabric surface 38 because there is no break in layer 34. Accordingly, there is no collapse upon bending, there is simply a resilient flexing which will ultimately urge the panel into its originally molded shape as set when the adhesive is cured.

The last two layers in the stack are a layer of adhesive impregnated remay 36 which is sandwiched between the upper layer 34 of polyurethane foam and the decorative fabric 38.

During the course of assembling this stack and before the layers are assembled sequentially, one at a time, each is coated or impregnated with a particular resin adhesive which has a curing temperature between 200°-275° F. except for layer 34 and the fabric layer 38. Adequate adhesive will be incorporated in the impregnated remay to bond the fabric 38 to the foamed resin layer 34.

The preferred adhesive is a mixture of about two-thirds polyol and about one-third isocyanate combined with a catalyst operable at the indicated temperature. Each of the six layers is saturated or impregnated in turn before it is stacked on the lower mold 20. Because the adhesive is structured to cure between 200°-275° F. and because the metal mold surfaces tend to hold heat, it has been discovered that the lower mold should be maintained at about 200° F. or less to prevent premature curing of the adhesive during the time period when the layers are being assembled in sequence.

During the manufacturing operation, the eight layers are stacked one after the other on the lower mold 20, then mold 22 is brought into place, and a pressure of about 5-50 tons is applied. The pressure may range from about 1.5 psi to 29 psi within the headliner, depending upon desired layer thicknesses and the shape of the product being formed. In the most preferred embodiments the pressure should be in the range of about 6-20 psi. Then the compressed panel is moved into a furnace area where the surface of the upper mold is heated to about 275° F. and after about three minutes at that pressure and temperature the molds are moved out of the furnace area, the upper mold is removed and the formed, cured laminate is ejected from the lower mold and the edges of the panel are trimmed to the desired configuration.

Because the mold surfaces are hot and there is economic benefit in maintaining a relatively stable continuous temperature, the molds will be moved back into operative position where the process will be repeated. There will be more than one set of mold surfaces in each assembly line but because of the high cost of molds there will not be an excess number. Thereby, there will not be too great a cooling of the mold surfaces before they are again pressed into service and inserted in the heating furnace. Circumstances may dictate that the molds be hotter and in such circumstances it may be desirable to invert the molds to place mold 22 on the bottom. In that situation fabric 38 would be the first layer deposited and because of its unsaturated condition it will serve as an insulator to retard any premature heat generated curing of the adhesive in the laminate.

The adhesive mixture preferred is about two-thirds polyether polyol, preferably in the range of about 60-75% by volume, to about one-third aromatic isocyanate by volume with an appropriate catalyst, although the volume of isocyanate could range from about 25-40%.

Useful are polyether polyols with the preferred polyol being a hydroxyl terminated poly(oxyalkylene) polyol, of appropriate molecular weight, such as obtainable from Mobay Corporation under the trademarks MULTRANOL 3900 (mol. wt. about 4800) and MULTRANOL 9157. Such polyether polyols may be used singly or in admixture in the adhesive mixture.

The preferred isocyanate is a polymethylenepolyphenylene ester of isocyanate acid, such as obtainable from Mobay Corporation under the trade designation MONDUR MR, whose composition consists essentially of about 45-55% of diphenylmethane diisocyanate (MDI), about 45-55% of higher oligomers of MDI, and a trace of phenyl isocyanate.

Suitable catalysts are available from Air Products and Chemicals, Inc. under the trade designation DABCO T-12 (a specially formulated high-boiling liquid dibutyltin dilaurate) or DABCO 33LV which is a triethylenediamine (TEDA) catalyst and particularly 1,4-diazobicyclo (2.2.2) octane. The proportions of catalyst needed may vary, depending upon curing temperature, relative humidity of the air and other factors known in the industry. By way of preferred example, in the above stated environmental conditions, about one and one-half grams of triethylenediamine are added to each gallon of polyol and followed by about three-fourth gram of the dibutyltin dilaurate being added to each gallon of polyol. Preferably the catalysts are added to the polyol prior to its mixture with the isocyanate.

While we have described the preferred embodiment with a particular polyol, isocyanate and catalyst, it will be clear that the time periods and the temperatures for curing could be modified by adjustment of the catalyst and other perimeters and these would be obvious modifications well within the inventive concept. Similarly, the curing time might be reduced for the liquid resin adhesive by a controlled increase in the humidity in the vicinity of the furnace.

While one-fourth inch open celled polyurethane foam is preferred for layers 34 and 28, the thickness could be increased or decreased without departing from the spirit of the invention. Thicker or thinner layers might be appropriate for other uses of similarly constructed panels, for example, door panels or side panels on a motor housing. The polyurethane foam preferred will have a density of about 3 lbs/ft.$^3$. The preferred foam may be obtainable from Burkhart Foam, Burkhart, Indiana and has an industry deflection designation of 60ILD.

Because the polyurethane foam layer 34 closest to the decorative layer 38 is uncoated and not impregnated with the adhesive, it tends to be and feels soft when touched or depressed from the decorative layer side 38. On the other hand, the polyurethane layer 28 is impregnated with the adhesive prior to the time it is assembled and when the cure takes place all of its cells are filled with adhesive and the curing results in a hard incompressible or more rigid feel. The result is that any creasing of the laminated panel resulting from bending may be evident in the layer 28 but the crease or bend will not propagate to the front of the laminate and be visible through the fabric 38 because the uncoated polyurethane foam layer 34 is not coated and not impregnated with the adhesive and retains its flexibility and compressibility because it is an open celled structure not prone to breaking of bubbles on bending.

Having thus described the invention in its preferred embodiment, it will be clear that other modifications may be made without departing from the spirit of the invention. Also the language used to describe the inventive concept and the drawings accompanying the application to illustrate the same are not intended to be limiting on the invention rather it is intended that the invention be limited only by the scope of the appended claims.

We claim:

1. A cured molded smooth contoured layered panel, said, layers being substantially coextensive, said panel including in sequence a decorative outer layer adhesively joined to a first open celled soft-feeling polyurethane foam layer, the cells of which are unfilled with hard material, a fiber glass layer sandwiched between and adhesively bonded to both the first foam layer and a second open celled hard-feeling polyurethane foam layer the cells of which are filled with cured adhesive, and a second fiber glass layer adhesively bonded to the second foam layer.

2. The panel of claim 1 wherein the adhesive used through out the panel cures at a temperature in the range 200°-275° F. in the presence of moisture in the air.

3. The panel of claim 2 wherein the adhesive is a mixture of polyol, isocyanate and a catalyst.

4. The panel of claim 1 wherein the adhesive is a mixture of polyol, isocyanate and a catalyst.

* * * * *